United States Patent
Kim et al.

(10) Patent No.: US 9,862,502 B2
(45) Date of Patent: Jan. 9, 2018

(54) ELECTRIC POWER SUPPLY SYSTEM HAVING ACTIVE POWER CONTROL DEVICE

(71) Applicant: KOREA AEROSPACE RESEARCH INSTITUTE, Daejeon (KR)

(72) Inventors: Keun Bae Kim, Daejeon (KR); Bo Hwa Lee, Daejeon (KR); Poo Min Park, Daejeon (KR); Chun Taek Kim, Daejeon (KR); Seok Min Ahn, Daejeon (KR); Soon Bae Chung, Daejeon (KR); Dong Sung Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 117 days.

(21) Appl. No.: 15/031,933

(22) PCT Filed: Oct. 29, 2013

(86) PCT No.: PCT/KR2013/009647
§ 371 (c)(1),
(2) Date: Apr. 25, 2016

(87) PCT Pub. No.: WO2015/060487
PCT Pub. Date: Apr. 30, 2015

(65) Prior Publication Data
US 2016/0297544 A1 Oct. 13, 2016

(30) Foreign Application Priority Data
Oct. 25, 2013 (KR) .................. 10-2013-0127548

(51) Int. Cl.
*B60L 1/00* (2006.01)
*B64D 47/00* (2006.01)
(Continued)

(52) U.S. Cl.
CPC ............ *B64D 47/00* (2013.01); *B64D 27/24* (2013.01); *H02J 7/0068* (2013.01); *H02J 7/34* (2013.01);
(Continued)

(58) Field of Classification Search
CPC ..................................................... B64D 47/00
See application file for complete search history.

(56) References Cited

U.S. PATENT DOCUMENTS

2009/0026316 A1\* 1/2009 Miller ................ B64C 39/024
244/123.1
2010/0156185 A1 6/2010 Kim et al.

FOREIGN PATENT DOCUMENTS

JP 11-113101 A 4/1999
JP 2005-053353 A 3/2005
(Continued)

*Primary Examiner* — Daniel Puentes
(74) *Attorney, Agent, or Firm* — Rabin & Berdo, P.C.

(57) ABSTRACT

As a component of an aerial vehicle, a power management system having an active power control device is provided. The system includes a solar cell converting solar energy into electric energy; a fuel cell provided in the aerial vehicle and converting fuel energy into electric energy by electrochemical reaction; a battery compensating for a lack of electric power supplied from the solar cell and the fuel cell to the aerial vehicle and storing surplus electric power; and an active power control device connecting with all the solar cell, the fuel cell and the battery and combining and distributing electric power generated in the solar cell, the fuel cell and the battery to loads. The system efficiently distributes the power from the respective power sources through the controllable output of the fuel cell in accordance with power required by the aerial vehicle and the solar cell's performance depending on weather.

10 Claims, 11 Drawing Sheets

(51) Int. Cl.
  *H02J 7/34* (2006.01)
  *H02J 7/00* (2006.01)
  *H02J 7/35* (2006.01)
  *B64D 27/24* (2006.01)
  *H02J 9/06* (2006.01)
  *H02J 1/00* (2006.01)
  *B64D 41/00* (2006.01)
  *H02J 3/38* (2006.01)

(52) U.S. Cl.
  CPC ............ *H02J 7/35* (2013.01); *H02J 9/06* (2013.01); *B64D 2041/005* (2013.01); *B64D 2211/00* (2013.01); *B64D 2221/00* (2013.01); *H02J 1/00* (2013.01); *H02J 3/383* (2013.01); *H02J 3/387* (2013.01); *H02J 2001/004* (2013.01); *Y02E 10/563* (2013.01); *Y02T 50/64* (2013.01); *Y02T 90/36* (2013.01)

(56) References Cited

FOREIGN PATENT DOCUMENTS

| | | |
|---|---|---|
| JP | 2013-041723 A | 2/2013 |
| KR | 10-2010-0073985 A | 7/2010 |
| KR | 10-1012430 B1 | 2/2011 |
| KR | 10-2013-0073244 A | 7/2013 |

\* cited by examiner

ELECTRIC POWER SUPPLY SYSTEM HAVING ACTIVE POWER CONTROL DEVICE

TECHNICAL FIELD

The present invention relates to a power management system having an active power control device, and more particularly to a power control device for actively controlling power supplied to a motor, mounted equipment or the like load in an unmanned or manned electrically powered aerial vehicle that employs a solar cell, a battery and a fuel cell as power sources while mainly using the battery, and a power management system having an active power control device which can bypass remaining power of the power sources, even though the power control device stops operating due to power interruption or a breakdown of supplying power to operate the power control device.

BACKGROUND ART

A conventional aerial vehicle generally employs a reciprocating engine or a gas turbine engine to generate power. Recently, an electrically powered aerial vehicle using a battery and a solar cell or a fuel cell has been developed but not commercialized yet.

Most of electrically powered aerial vehicles developed hitherto have used a single or combination of the battery, the solar cell and the fuel cell as the power sources and passively controlled power according to loads since the power sources are directly connected to a motor without any separate power control device.

FIG. 1 illustrates power sources and a load in a conventional electrically powered aerial vehicle.

As shown in FIG. 1, the power sources such as the battery, the solar cell and the fuel cell are directly connected to the load such as a motor without a power management system (PMS) and directly supply the power to the load such as the motor, and therefore the power is not efficiently distributed.

PRIOR ART

Patent Document

Korean Patent No. 10-1012430 (Jan. 26, 2011)

DISCLOSURE

Technical Problem

The present invention is conceived to solve the foregoing problems, and an aspect of the present invention is to provide a power management system (PMS) having the active power control device, which applies integrated management and control to power between each of power sources and a motor (i.e. load) in a hybrid electrically powered aerial vehicle employing a battery, a solar cell and a fuel cell as power sources, and actively controls the power supplied from the power sources to the load in accordance with mission profile and required power of the aerial vehicle.

Technical Solution

In accordance with one aspect of the present invention, there is provided a power management system having an active power control device as a component of an aerial vehicle, which includes a solar cell converting solar energy into electric energy; a fuel cell provided in the aerial vehicle and converting fuel energy into electric energy by electrochemical reaction; a battery compensating for a lack of electric power supplied from the solar cell and the fuel cell to the aerial vehicle and storing surplus electric power; and an active power control device connecting with all the solar cell, the fuel cell and the battery and combining and distributing electric power generated in the solar cell, the fuel cell and the battery to loads.

Advantageous Effects

On the contrary to a conventional passive system, the system according to the present invention has effects on efficiently distributing the power from the respective power sources through the controllable output of the fuel cell in accordance with power required by the aerial vehicle and the solar cell's performance depending on weather so as to maximize an efficiency of loaded fuel, and stably maintaining a minimum state of charge (SOC) of the battery to thereby guarantee a mission capability.

Further, the power management system having the active power control device according to the present invention has effects on automatically bypassing usable power of the power sources toward the load and securing the stability of the aerial vehicle even when the system breaks down or the power sources for supplying power to operate the power control device are suddenly interrupted.

BEST MODE

Figure 1:
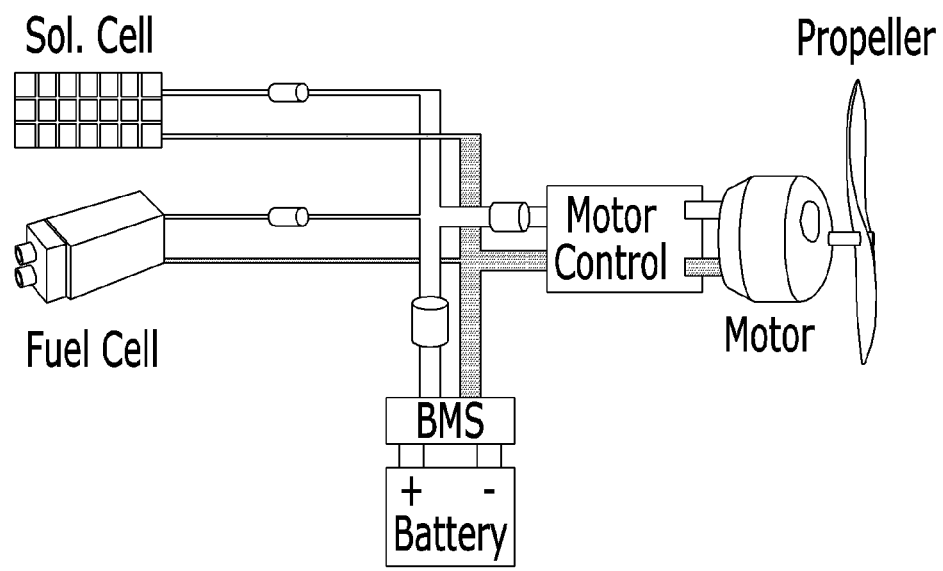
FIG. 1 is a view of illustrating power sources and a load in a conventional electrically powered aerial vehicle.

Embodiments of the present invention will be described in detail with reference to the accompanying drawings. Prior to the description, it will be appreciated that terms and words used in the following description and claims have to be interpreted by not the limited meaning of the typical or dictionary definition, but the meaning and concept corresponding to the technical idea of the present invention on the assumption that the inventor can properly define the concept of the terms in order to describe his/her own invention in the best way.

Further, embodiments described in this specification and elements shown in the drawings are nothing but preferable examples, and do not represent the entirety of the present technical idea. Accordingly, it will be appreciated that they may be replaced by various equivalents and modifications on the filing date of the present invention.

Figure 2:
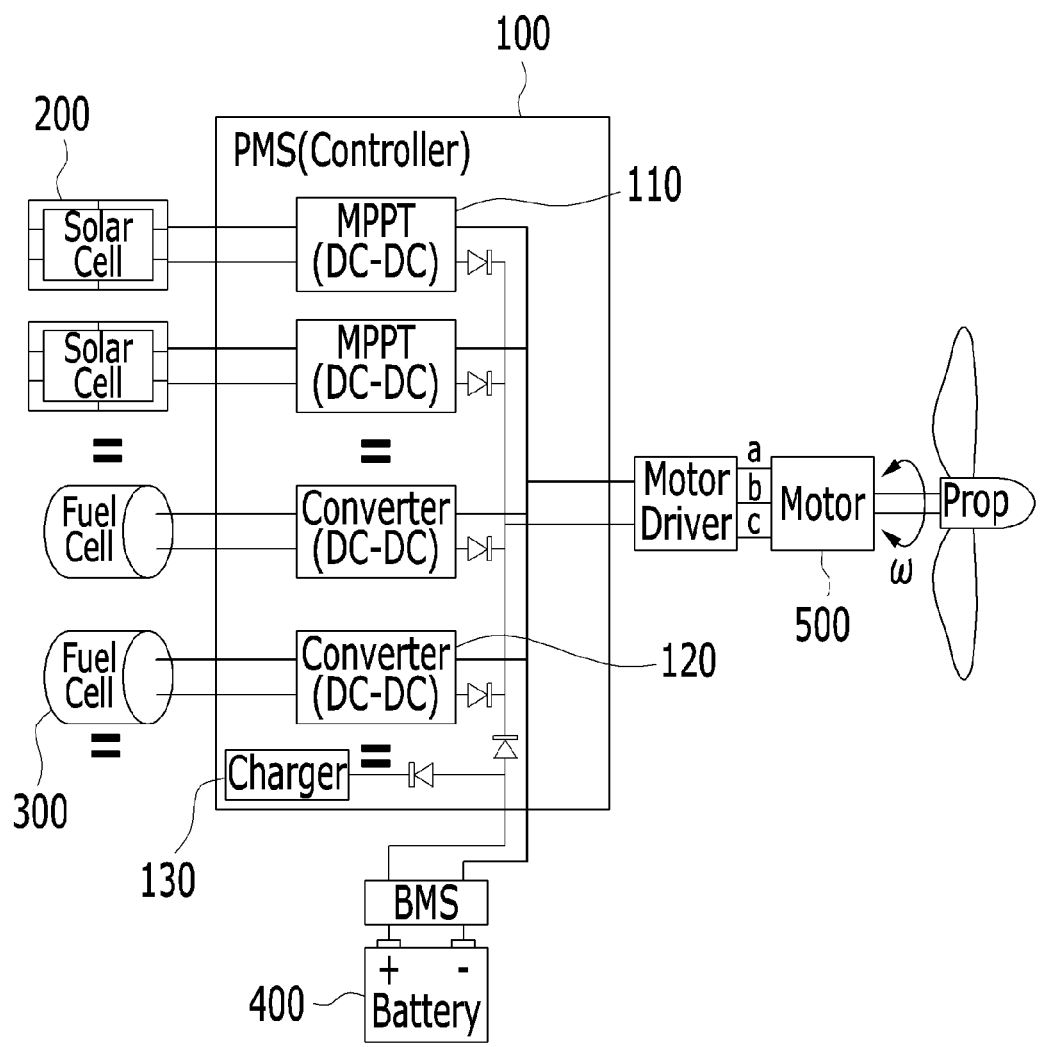
FIG. 2 is a block diagram of a power management system with an active power control device according to the present invention.

Referring to FIG. 2, a power management system with an active power control device includes an active power control device 100, a solar cell 200, a fuel cell 300, a battery 400, and a load 500.

The respective numbers of solar cells 200, fuel cells 300 and battery 400 are not limited to those shown in FIG. 2 and may vary depending on requirements. In accordance with their numbers, the number of maximum power point trackers (MPPT) and DC-DC converter may be changed.

The solar cell 200 is installed to be exposed to sun and converts light energy into electric energy. The power output of the solar cell 200 is varied depending on weather and sunlight conditions.

The fuel cell 300 is filled with fuel as much as needed by an aerial vehicle and generates electricity by an electrochemical reaction of the fuel.

The battery 400 serves to compensate for a lack of electric power and store surplus electric power.

The active power control device 100 connects with all the solar cell 200, the fuel cell 300 and the battery 400 and efficiently distributes the power supplied from the power sources, i.e. the solar cell 200, the fuel cell 300 and the battery 400 to the load 500.

The active power control device 100 includes an MPPT 110 for the solar cell, a converter 120 for a fuel cell, and a charging circuit 130.

The MPPT 110 for the solar cell converts power and supplies it to an output terminal so that the output of the solar cell 200 can be maximized regardless of weather, The converter 120 for the fuel cell is a DC/DC converter for controlling the output of the fuel cell and is controlled by a controller (to be described later) to adjust the output so that the efficiency of the filled fuel can be maximized.

The charging circuit 130 maintains a state of charge (SOC) of the battery at an optimum level by the surplus power of the solar cell or working of the fuel cell in flight in order to efficiently use the battery 400.

For reference, the controller (not shown) measures voltage, current and temperature of the MPPT 110 for the solar cell, the converter 120 for the fuel cell, the battery 400, the motor 500, etc. and applies integrated control to them so that components of the aerial vehicle can be full-efficiently operated in response to a required power signal of a flight control computer provided in the aerial vehicle. Further, the controller determines the state of the power sources and the SOC of the battery and turns on/off the fuel cell 300 for the power distribution so as to efficiently use the filled fuel.

The active power control device 100 fundamentally operates by power supplied from the solar cell 200, the fuel cell 300 and the battery 400, and may be provided with a separate dedicated (small) auxiliary battery 600 as a backup power supply in preparation for the interruption or lack of the power sources.

Further, the foregoing elements have protection functions against overvoltage, reverse voltage, overcurrent or the like disturbance. For example, a diode, a field effect transistor (FET), etc. are provided to protect the elements from reverse current.

Each MPPT 110 for the solar cell includes a bypass module 111 and an MPPT module 112, which are arranged in parallel with each other, and a diode D at a rear end thereof to prevent reverse current as described above.

The same may be applied to the converter 120 for the fuel cell.

Figure 3:
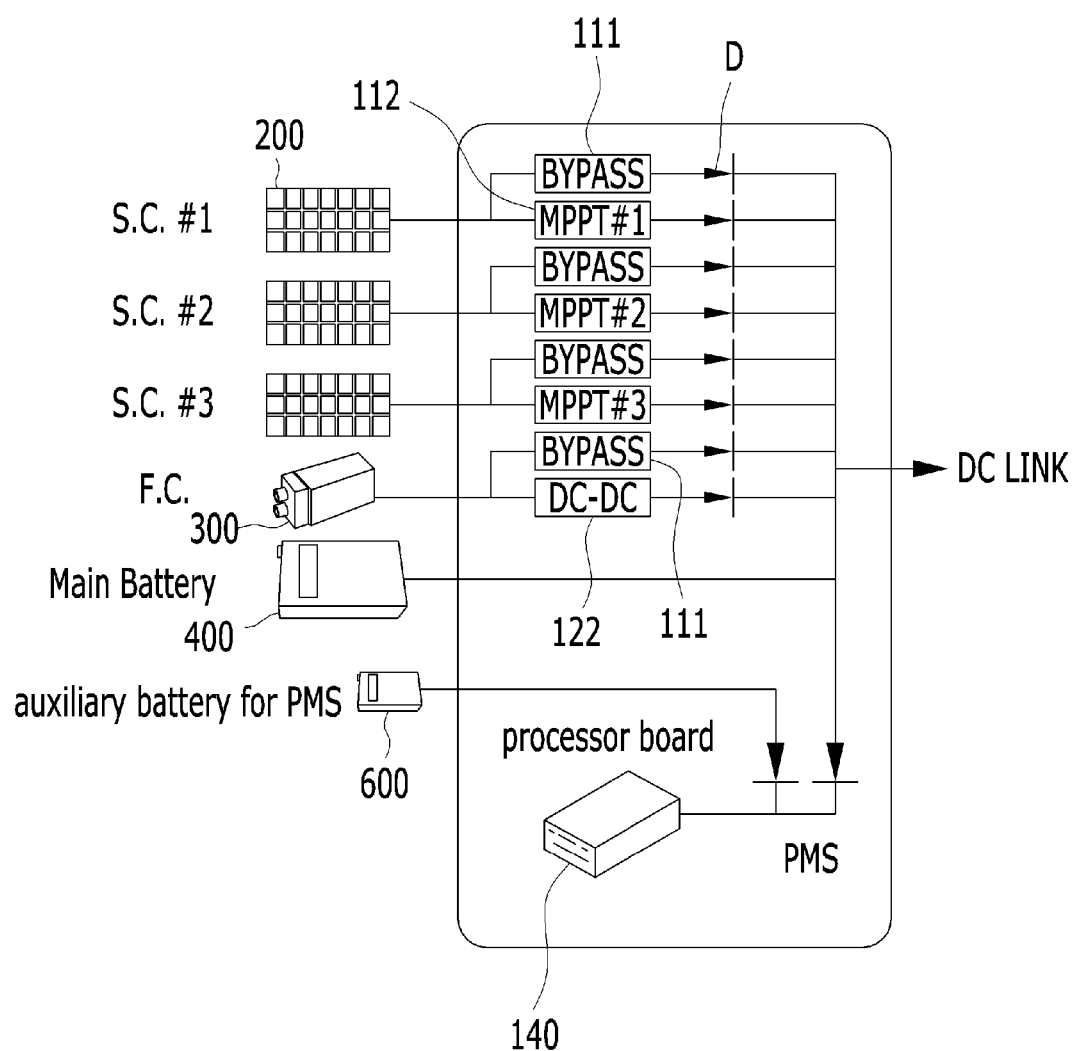
FIG. 3 is a view of illustrating a basic power connection state.

According to the present invention, the power management system with the active power control device includes the battery 400 and the auxiliary battery 600 for the power management system (PMS) which are connected by a bus as shown in FIG. 3, so that, even though anyone of the solar cell 200, the fuel cell 300 and the battery 400 is interrupted, the other power sources can supply power.

The MPPT module 112 receives power from the solar cell 200, and does not operate while the solar cell 200 generates no electricity, thereby reducing power consumption. On the other hand, the bypass module 111 reliably operates to supply power from the auxiliary battery 600 to the DC-LINK even though the power supply are unstable as shown in FIG. 4.

Figure 4:
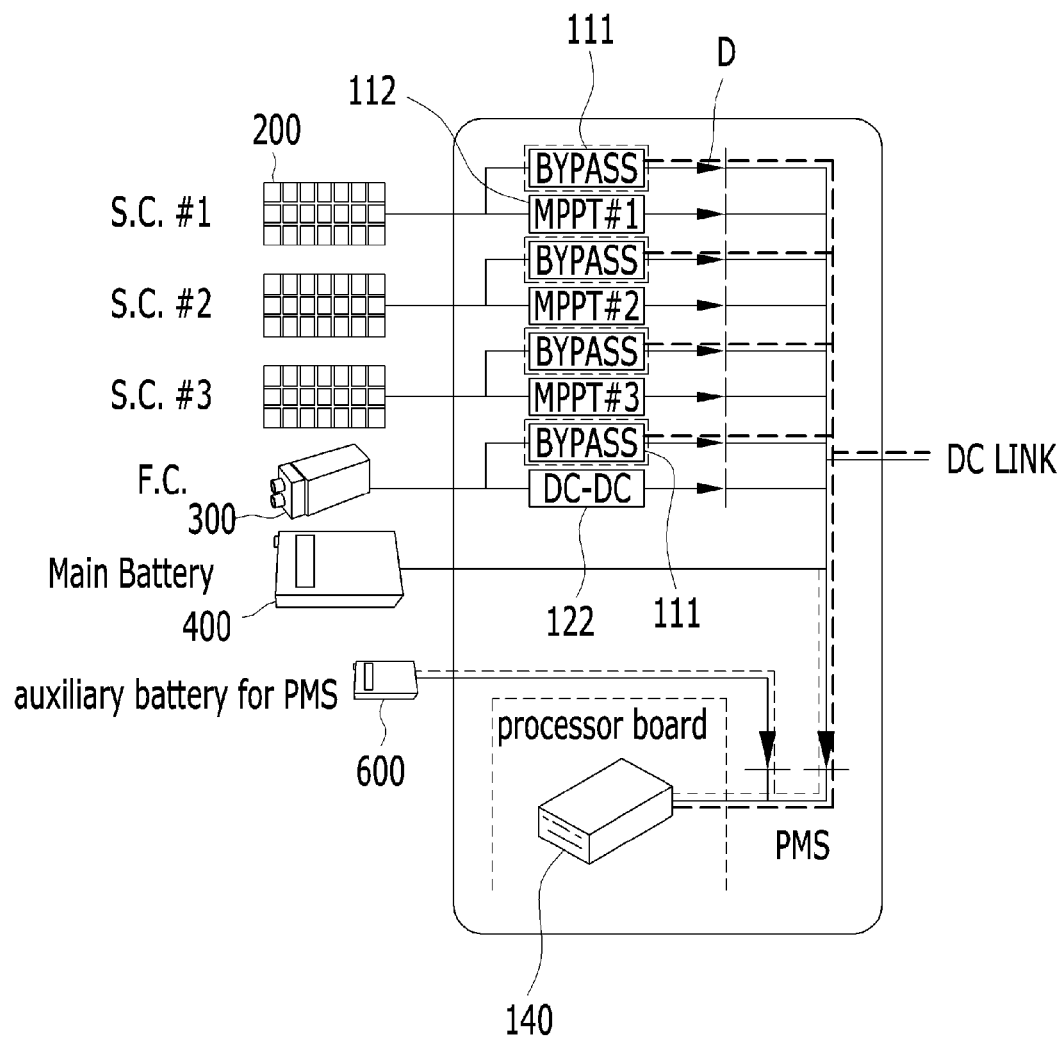
FIG. 4 is a view of illustrating a power connection state of a bypass circuit.

For reference, FIG. 4 is a view of illustrating a power connection state of a bypass circuit.

In the power management system with the active power control device according to the present invention, the bypass module 111 operates to directly supply the power from the solar cell 200 and the fuel cell 300 to the DCLINK, to which the load 500 is connected, when the power control device cannot normally operate due to sudden interruption of the supplied power or its own breakdown.

As shown in FIG. 3 and FIG. 4, the active power control device 100 further internally includes a processor board 140, and the processor board 140 controls the whole system. Further, the bypass module 111 is provided in case the processor board 140 does not operate. In general, a metal oxide semiconductor field effect transistor (MOSFET), a relay and a transistor (Tr) are all usable as the bypass switch. However, the relay is bulky and heavy, and the transistor is slow and generates much heat. Therefore, the most effective one is the MOSFET.

For reference, FIG. 3 is a view of illustrating a basic power connection state.

The solar cell 200 operates independently of the processor board 140 through each MPPT module 112, and operates in an MPPT mode if the MPPT module 112 is normal even though the processor board 140 does not operate, thereby supplying the power as long as the solar cell 200 operates even if the active power control device 100 is turned off.

Further, the bypass module 111 operates the moment when the MPPT module 112 of the solar cell 200 breaks down, thereby supplying the power from the solar cell 200 to the DC LINK.

In addition, the fuel cell 300 is dependently controlled by the processor board 140 through a DC-DC module 122 of each converter 120 for the fuel cell, and supplies the power in the state that both the processor board 140 and the DC-DC module 122 are normally operated. However, the bypass module 111 operates the moment when the processor board 140 or the DC-DC module 122 is not operated, so that the power of the fuel cell 300 can be supplied to the load 500.

By the way, if the fuel cell 300 is operating, the power of the fuel cell 300 can be supplied to the DC LINK through the bypass module 111 even though the active power control device 100 is turned off.

Below, the respective outputs of the power sources will be described in more detail.

Figure 5:
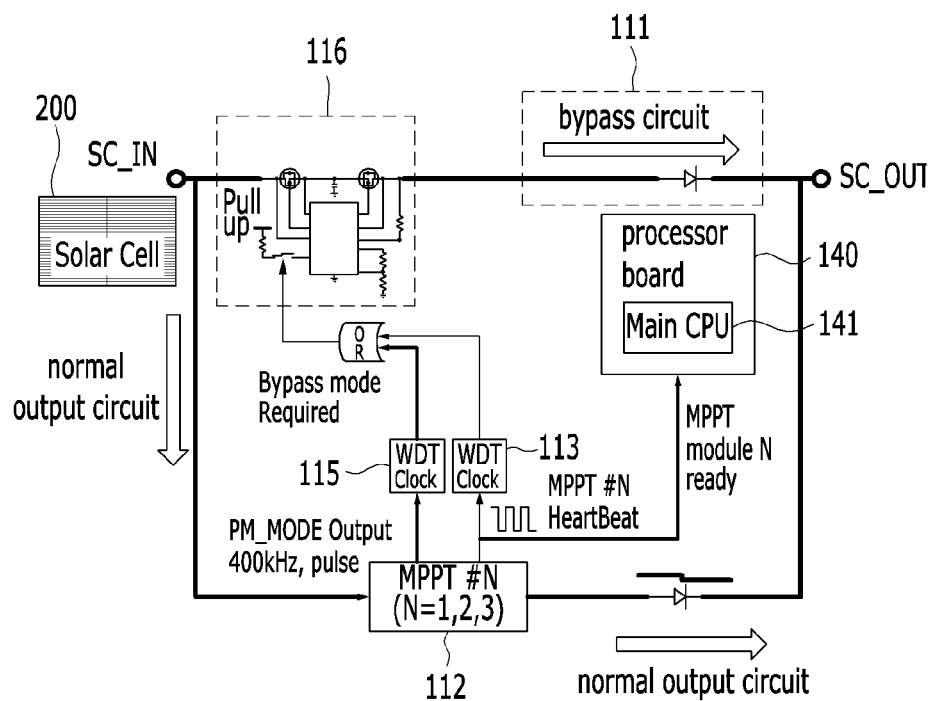
FIG. 5 is a view of illustrating an output circuit of a solar cell.

First, the output of the solar cell will be described with reference to FIG. 5. For reference, FIG. 5 is a view of illustrating an output circuit of a solar cell.

The output of the solar cell 200 is normally supplied through the MPPT module 112, but automatically bypassed through the bypass module 111 when the processor board 140 and the MPPT operating mode circuit are not normally operated.

The processor board 140 includes a main central processing unit (CPU) 141 to control the system.

Further, the MPPT 110 for the solar cell includes an MPPT module monitoring timer 113, a PM mode monitoring timer 114, an OR gate 115 and a bypass switch 116 in addition to the bypass module 111 and the MPPT module 112.

Figure 6:
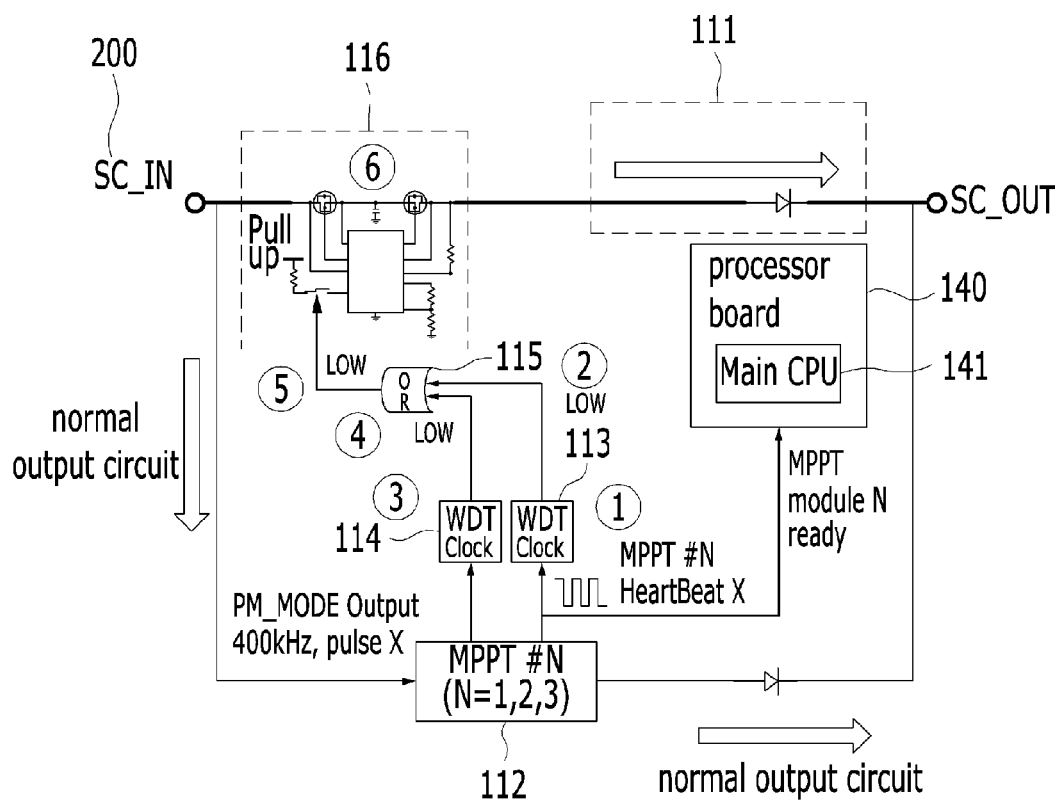
FIG. 6 is a view for explaining a normal output through a maximum power point tracker (MPPT) module.

Referring to FIG. 6, the normal output through the MPPT module will be described.

For reference, FIG. 6 is a view for explaining the normal output through the MPPT module.

As shown in FIG. 6, if power is applied to the MPPT 110 for the solar cell, a heartbeat toggle signal of the MPPT module 112 is output, and the MPPT module monitoring timer 113 connected to the MPPT module 112 outputs a low signal if the toggle signal is applied for a few milliseconds.

At this time, a PM mode operation signal (400 kHz) of the MPPT module 112 is not output.

The PM mode monitoring timer 114 outputs a low signal if the toggle signal is not sensed for a few milliseconds.

The OR gate 115, which receives the low signals from the MPPT module monitoring timer 113 and the PM mode monitoring timer 114, transmits the low signal to the bypass switch 116, and the bypass switch 116 receives the low signal and is turned off. In result, the power is output through the MPPT module 112.

On the other hand, the abnormal output through the MPPT module will be described with reference to FIG. 7.

Figure 7:
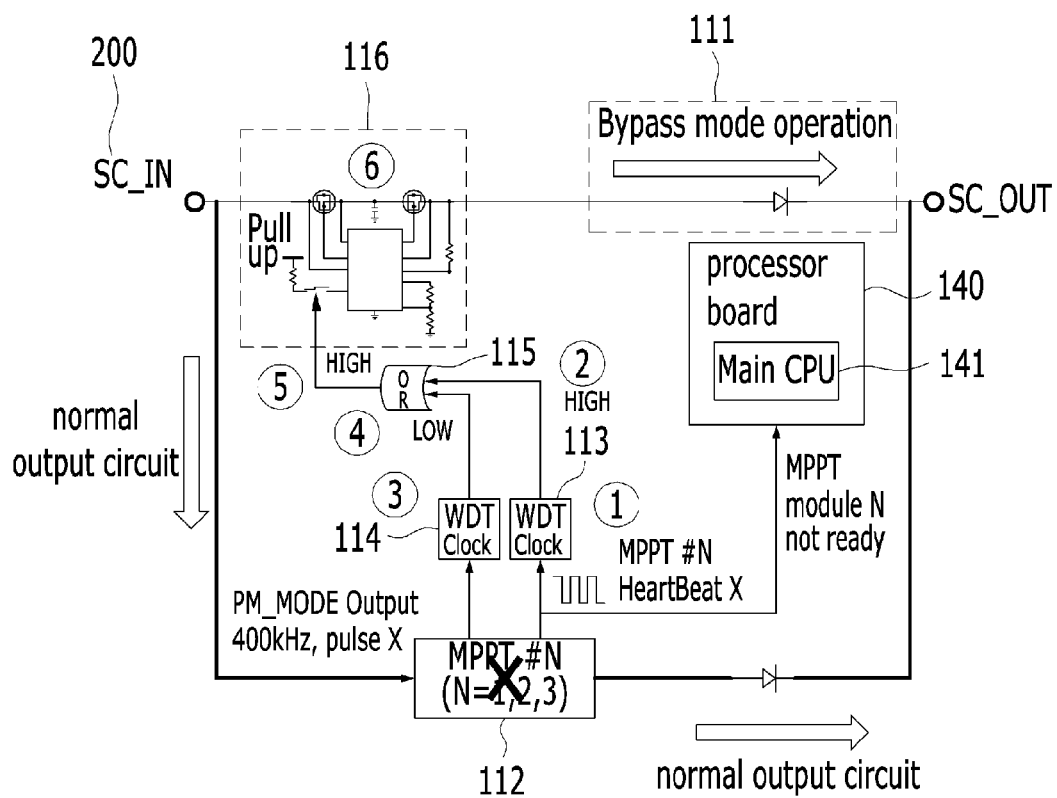
FIG. 7 is a view for explaining an abnormal output through a bypass module.

For reference, FIG. 7 is a view for explaining an abnormal output through a bypass module.

That is, FIG. 7 illustrates an initial state before the MPPT module 112 and the processor board 140 are booted up, in which the output of the solar cell is bypassed by the operation of the bypass switch 116 and also bypassed when the MPPT module 112 is not normally operated in the state that power is applied to the MPPT 110 for the solar cell.

As shown in FIG. 7, a high signal is output if a heartbeat signal of the MPPT module 112 is not toggled before the MPPT module 112 and the processor board 140 are booted up, and the toggle signal of the MPPT module monitoring timer 113 connected to the MPPT module 112 is not toggled for a few milliseconds.

At this time, the PM mode operation signal (400 kHz) of the MPPT module 112 is not output.

The PM mode monitoring timer 114 outputs a low signal if the signal is not toggled for a few milliseconds.

The OR gate 115, which receives a high signal and a low signal from the MPPT module monitoring timer 113 and the PM mode monitoring timer, finally transmits the high signal to the bypass switch 116, and the bypass switch 116 receives the high signal and is turned on. In result, bypass power is output through the bypass module 111.

Next, the normal output and abnormal output of the fuel cell will be described.

Figure 8:
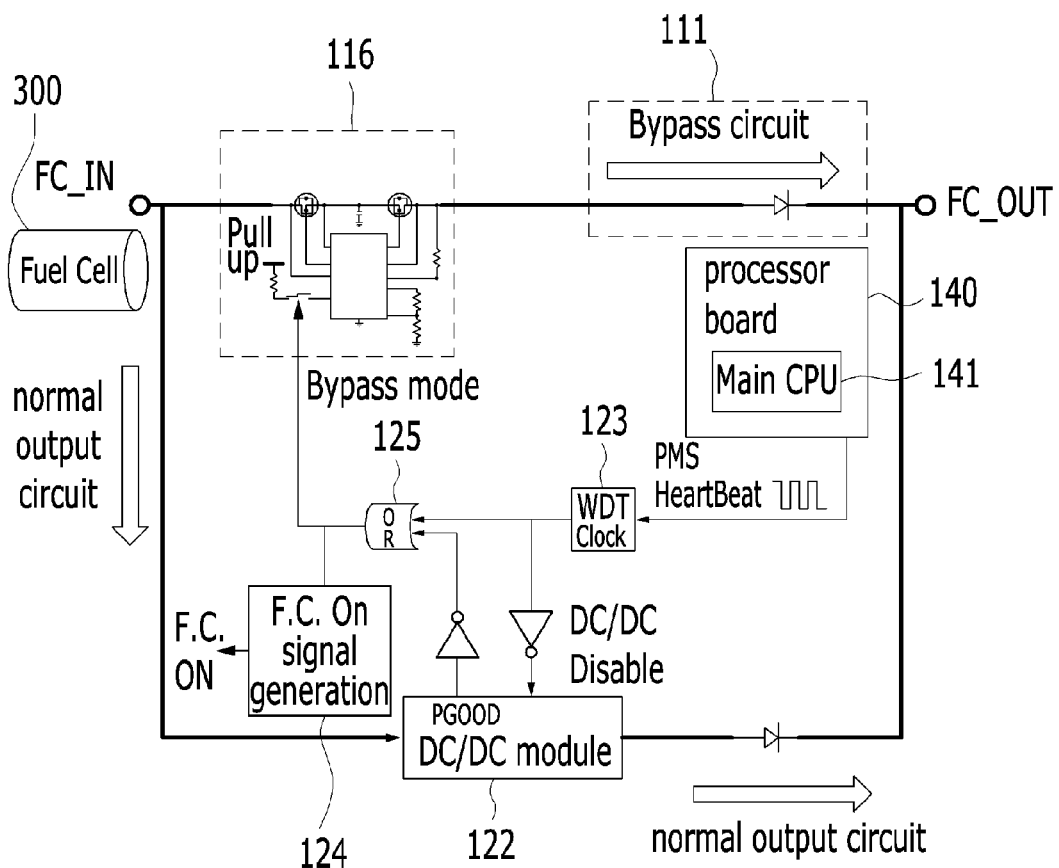
FIG. 8 is a view of illustrating an output circuit of a fuel cell.

First, the converter 120 for the fuel cell includes a processor board monitoring timer 123 and an OR gate 125 in addition to the bypass module 111 and the DC-DC module 122 as shown in FIG. 8.

For reference, FIG. 8 is a view of illustrating the output circuit of the fuel cell.

As shown in FIG. 8, the output of the fuel cell is normally supplied through the DC-DC module 122 directly controlled by the processor board 140, but automatically bypassed through the bypass module 111 if the processor board 140 does not operate or if the DC-DC module 122 does not work.

Figure 9:
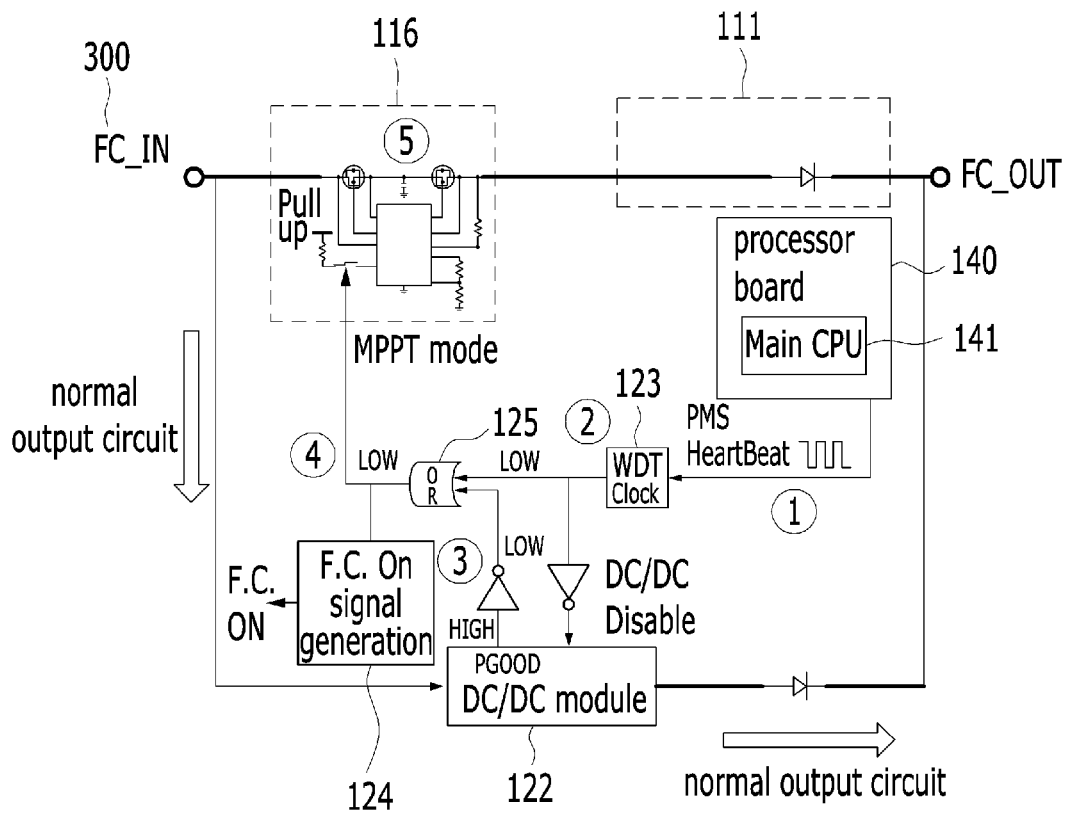
FIG. 9 is a view for explaining a normal output of the fuel cell.

Referring to FIG. 9, the normal output through the DC-DC module 122 will be described in more detail.

For reference, FIG. 9 is a view for explaining the normal output of the fuel cell.

As shown in FIG. 9, if power is applied to the processor board 140 and the DC-DC module 122, a heartbeat signal is output as a toggle signal at a main CPU 141 of the processor board 140, and a processor board monitoring timer 123 connecting with the processor board 140 outputs a low signal if the toggle signal is applied from the processor board 140 within a few milliseconds.

The DC-DC module 122 has a PGOOD terminal, and the PGOOD terminal outputs a high signal if the output of the PGOOD terminal satisfies a range of ±10% of a reference voltage and then the high signal is inversed and output as a low signal.

The OR gate 125 applies OR logic to two signals received from the processor board 140 and the DC-DC module 122 and outputs a low signal.

The bypass switch 116 connected to an output terminal of the OR gate 125 receives the low signal and is thus turned off. In result, the power is output through the DC-DC module 122.

On the other hand, the abnormal output through the DC-DC module 122 will be described with reference to FIG. 10.

Figure 10:
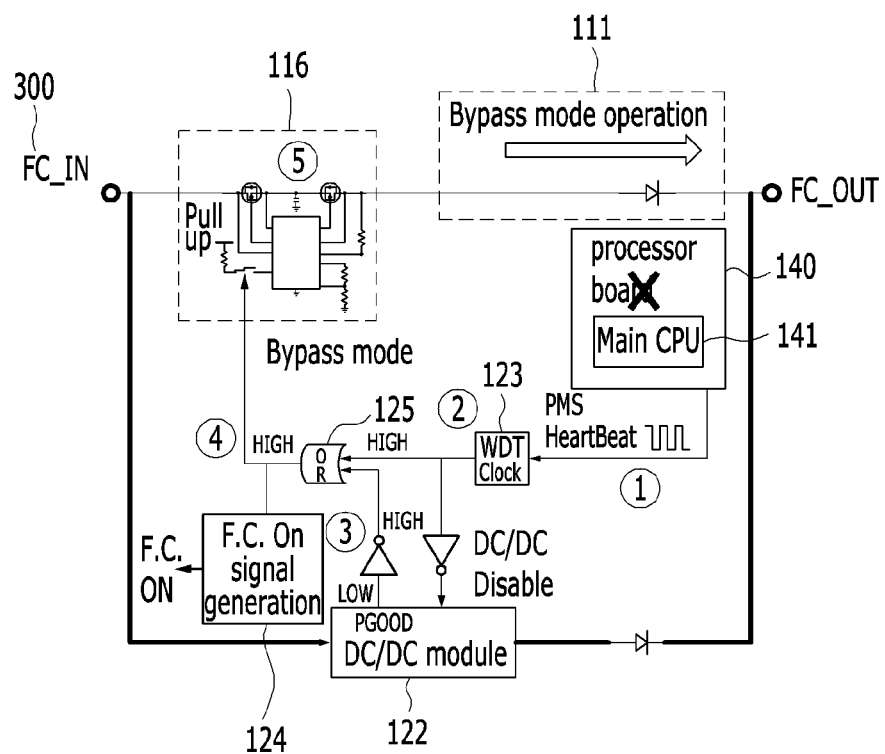
FIG. 10 is a view for explaining an abnormal output of the fuel cell.

For reference, FIG. 10 is a view for explaining an abnormal output of the fuel cell.

FIG. 10 illustrates a state before the processor board 140 is booted up, in which the bypass mode switch operates to bypass the output of the fuel cell.

In more detail, if the processor board 140 is not booted up as described above, the heartbeat signal from the main CPU 141 of the processor board 140 is not toggled.

The processor board monitoring timer 123 connecting with the processor board 140 outputs the high signal if the toggle signal is not toggled within a few milliseconds in the processor board 140.

The DC-DC module 122 has the PGOOD terminal, and the PGOOD terminal outputs a low signal if the output of the PGOOD terminal is beyond the range of ±10% of the reference voltage and then the low signal is inversed and output as a high signal.

The OR gate 125 applies the OR logic to two signals received from the processor board 140 and the DC-DC module 122 and outputs a high signal.

The bypass switch 116 connected to the output terminal of the OR gate 125 receives the high signal and is thus turned on. In result, the bypassed power is output.

Figure 11:
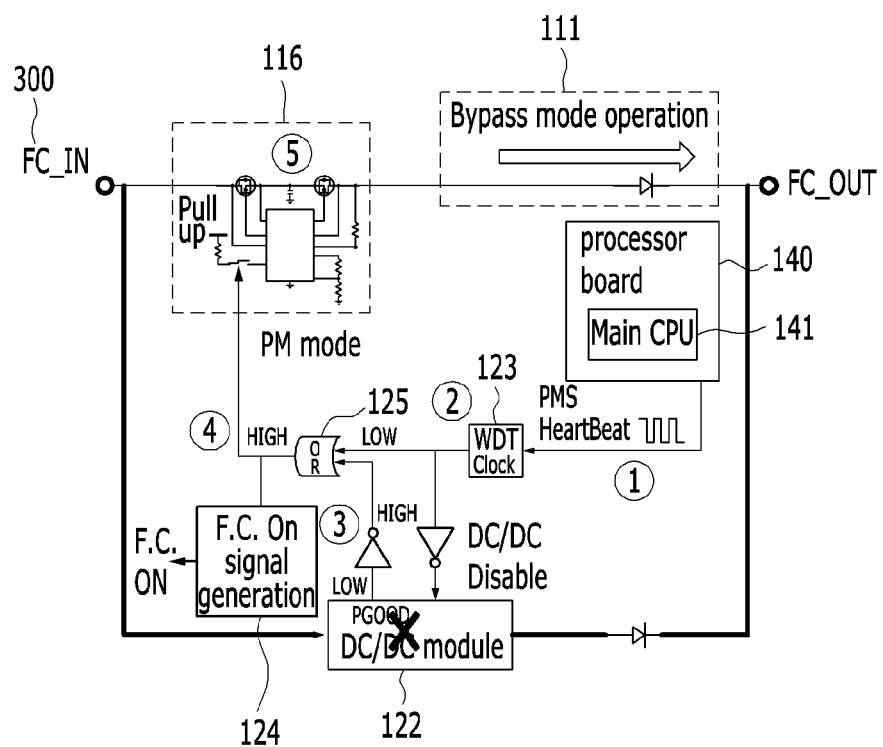
FIG. 11 is a view for explaining another abnormal output of the fuel cell.

Referring to FIG. 11, another abnormal output through the DC-DC module 122 will be described in more detail.

For reference, FIG. 11 is a view for explaining another abnormal output of the fuel cell.

That is, FIG. 11 illustrates the abnormal output switched by the operation of the bypass mode switch even when the processor board 140 is powered on but does not operate normally.

In more detail, if the processor board 140 is supplied with power but does not normally operate as described above, the heartbeat signal of the main CPU 141 of the processor board 140 is normally toggled.

The processor board monitoring timer 123 connecting with the processor board 140 outputs a low signal since the toggle signal of the processor board 140 is toggled for a few milliseconds.

The DC-DC module 122 has the PGOOD terminal, and the PGOOD terminal outputs a low signal if the output of the PGOOD terminal is beyond the range of ±10% of the reference voltage and then the low signal is inversed and output as a high signal.

The OR gate 125 applies the OR logic to two signals received from the processor board 140 and the DC-DC module 122 and outputs a high signal.

The bypass switch 116 connected to the output terminal of the OR gate 125 receives the low signal and is thus turned on. In result, the bypassed power is output.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

REFERENCE NUMERALS

- 100: active power control device
- 110: MPPT for solar cell
- 111: bypass module
- 112: MPPT module
- 113: MPPT module monitoring timer
- 114: PM mode monitoring timer
- 115: OR gate
- 116: bypass switch
- 120: converter for fuel cell
- 122: DC-DC module
- 123: processor board monitoring timer
- 125: OR gate
- 130: the charging circuit
- 140: processor board
- 141: main CPU
- 200: solar cell
- 300: fuel cell
- 400: battery
- 500: load
- 600: auxiliary battery
- D: diode

The invention claimed is:

1. A power management system with an active power control device for supplying power to an aerial vehicle as a component of the aerial vehicle, the power management system comprising:
   a solar cell converting solar energy into electric energy;
   a fuel cell provided in the aerial vehicle and converting fuel energy into electric energy by electrochemical reaction;
   a battery compensating for a lack of electric power supplied from solar cell and the fuel cell to the aerial vehicle and storing surplus electric power; and
   an active power control device connecting with all the solar cell, the fuel cell and the battery and combining and distributing electric power generated in the solar cell, the fuel cell and the battery to loads.

2. The power management system with the active power control device according to claim 1, wherein the active power control device comprises:
   a maximum power point tracker (MPPT) for the solar cell, which converts output of the solar cell into power and supplies the power to an output terminal;
   a converter for the fuel cell which controls output of the fuel cell;
   a charging circuit which maintains a state of charge (SOC) of the battery at an optimum level by charging the battery with surplus power of the solar cell and working the fuel cell; and
   a processor board which controls output of the MPPT for the solar cell and the converter for the fuel cell.

3. The power management system with the active power control device according to claim 2, wherein the active power control device further comprises a separate dedicated (small) auxiliary battery for backup in preparation for an interruption or lack of power sources.

4. The power management system with the active power control device according to claim 2, wherein the MPPT for the solar cell comprises:
   an MPPT module provided for normal output of the solar cell;
   a bypass module arranged in parallel with the MPPT module and provided for abnormal output when the MPPT module breaks down;
   an MPPT module monitoring timer connecting with the MPPT module and monitoring a toggle signal applying time of the MPPT module;
   a PM mode monitoring timer connecting with the MPPT module and monitoring whether a PM mode operation signal of the MPPT module is output;
   an OR gate applying OR logic to signals output from the MPPT module monitoring timer and the PM mode monitoring timer; and
   a bypass switch connected to an output terminal of the OR gate and tuned on or off.

5. The power management system with the active power control device according to claim 4, wherein in a case where power is supplied from the solar cell to the MPPT for the solar cell,
   if the MPPT module outputs a heartbeat signal as a toggle signal within a few seconds, the MPPT module monitoring timer for monitoring the MPPT module outputs a low signal, and
   if the PM mode monitoring timer does not sense the PM mode operation signal of the MPPT module and outputs a low signal, the OR gate turns off the bypass switch connected to the output terminal thereof so that power can be output through the MPPT module.

6. The power management system with the active power control device according to claim 4, wherein in a case where power is supplied from the solar cell to the MPPT for the solar cell,
   if a heartbeat signal is not toggled in the MPPT module for a few seconds, the MPPT module monitoring timer for monitoring the MPPT module outputs a high signal, and
   if the PM mode monitoring timer does not sense the PM mode operation signal of the MPPT module and outputs a low signal, the OR gate turns on the bypass switch connected to the output terminal thereof so that power can be bypassed through the bypass module.

7. The power management system with the active power control device according to claim 2, wherein the converter for the fuel cell comprises
   a DC-DC module provided for normal output of the fuel cell;
   a bypass module arranged in parallel with the DC-DC module and provided for abnormal output when the DC-DC module breaks down; and a processor board monitoring timer connecting with the processor board;

an OR gate applying OR logic to signals output from the processor board monitoring timer and a PGOOD terminal of the DC-DC module; and a bypass switch connected to an output terminal of the OR gate and turned on or off.

8. The power management system with the active power control device according to claim 7, wherein in a case where power is supplied from the fuel cell to the processor board and the DC-DC module, if a main central processing unit (CPU) of the processor board outputs a toggled heartbeat signal within a few seconds, the processor board monitoring timer connected to the processor board outputs a low signal, and if the PGOOD terminal of the DC-DC module outputs a high signal and the high signal is inversed at an output terminal and output as a low signal, the OR gate receives the low signals and turns off the bypass switch connected to the output terminal thereof so that power can be output through the DC-DC module.

9. The power management system with the active power control device according to claim 7, wherein in a case where power is supplied from the fuel cell to the DC-DC module and the processor board is not booted up, if a toggled heartbeat signal is not output from the main CPU of the processor board for a few seconds, the processor board monitoring timer for monitoring the processor board outputs a high signal, and if the PGOOD terminal of the DC-DC module outputs a low signal and the low signal is inversed at an output terminal and output as a high signal, the OR gate receives the high signals and turns on the bypass switch connected to the output terminal thereof so that power can be bypassed through the bypass module.

10. The power management system with the active power control device according to claim 7, wherein if power is supplied from the fuel cell to the processor board and the DC-DC module, but the DC-DC module does not normally work, the processor board monitoring timer outputs a low signal since a toggle signal is toggled in the processor board for a few seconds, and if the PGOOD terminal of the DC-DC module outputs a low signal, and the low signal is inversed at an output terminal and output as a high signal, the OR gate receives the low signal and the high signal and turns on the bypass switch connected to the output terminal thereof so that power can be bypassed through the bypass module.

* * * * *